Nov. 6, 1928.　　　　　　　　　　　　　　　　　1,690,556
J. SHAPIRO
ICE CREAM CONE
Filed Sept. 24, 1927
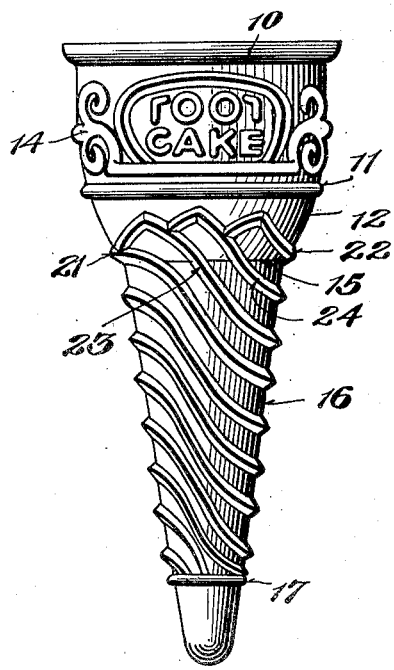
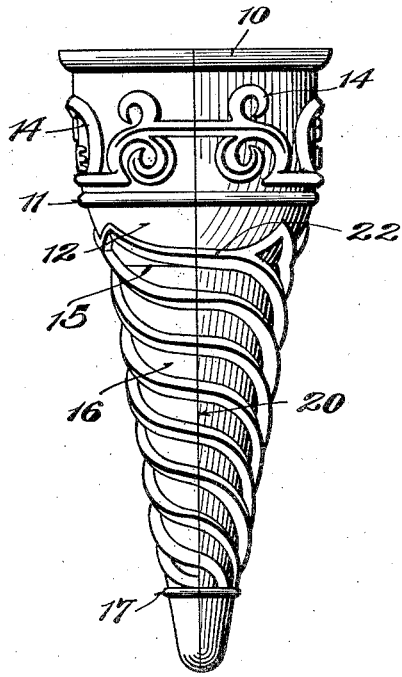
Inventor
Joseph Shapiro,
By H. H. Snelling
Attorney Patented Nov. 6, 1928.

1,690,556

UNITED STATES PATENT OFFICE.

JOSEPH SHAPIRO, OF BALTIMORE, MARYLAND, ASSIGNOR TO MARYLAND BAKING COMPANY, OF BALTIMORE, MARYLAND.

ICE-CREAM CONE.

Application filed September 24, 1927. Serial No. 221,784.

This invention relates to pastry cones and has for its object the provision of an improved ice cream cone of the bowl and stem type.

Altho the bowl style cone has been on the market for some little time and is extremely popular by virtue of the fact that it so conveniently receives a helping of ice cream from the usual scoop it is essentially weak and frequently breaks in the circular line of junction between the bowl and stem. It is a particular object of the present invention to obviate this breaking and to strengthen this weak point without increasing the difficulties of baking and without destroying the looks of the article.

In the drawings:—

Figure 1 is a side elevation showing the device with the two mold lines at the sides.

Figure 2 is a view at right angles thereto showing the mold line in the center.

The ice cream cone of edible pastry following usual practice has a strengthening rim 10, a breakage ring 11, a bowl portion 12 ornamented as at 14 and extending down to the junction line 15 which is scarcely visible in the actual cone. The stem 16 is truly conical and forms a slender handle portion. In the particular style shown the stem has a small ring 17 near the bottom while the tip of the cone 18 is entirely smooth. It will be understood by those skilled in the art that the device is an integral piece and is formed by two similar mold sections which close upon each other thereby forming a mold line 20 which may be scarely visible but often is quite marked. The interior of the cone is smooth and is not thickened at the junction of the bowl and stem as this has been found by years of experience to be impractical.

In order to strengthen the cone at the circular line of junction 15 the ornamental ribs are made to play a utilitarian part. These ribs each wind somewhat spirally about the stem and are here shown as six in number, all of them merging into the small ring 17 and each crossing the line of junction 15, two of them, namely 21 and 22, crossing the mold line 20, where it crosses the junction line 15, at right angles and therefore being tangent to the bowl at this point. The two intermediate ribs 23 and 24 and the similar ribs on the other side cross the junction line 15 at an angle of 45° to both horizontal and vertical, considering the axis of the cone as vertical.

It will be noted that the length of the horizontal portion of the ribs 21 and 22 is very much greater than the distance between the ribs 23 and 24 so that a particularly strong reenforcing is had to the cone at its weak line of junction between the bowl and the stem and this improved cone is consequently well able to stand the crushing force exerted by the attendant as he grasps the slender stem and pushes the helping of ice cream firmly home in the bowl, grasping, as he does, the cone as near the bottom as he can so as to touch as little of the edible material as possible.

What I claim is:

1. A molded edible pastry ice cream cone of the type having a bowl and an integral conical stem or handle portion, characterized by the provision of a plurality of parallel ribs two of which are tangent to the bowl at the mold line, and intermediate ribs extending across the junction of bowl and stem at an angle.

2. The device of claim 1 in which the ribs extend above the surface of the cone at least as far as the cone is thick.

3. The device of claim 1 in which the ribs are higher than they are wide.

4. The device of claim 1 in which each rib extends more than 360° around the stem and on to the bowl.

5. The device of claim 1 in which the two ribs are diametrically disposed and there are two ribs on each side between said two tangent ribs and each rib crosses the circular junction of the stem and bowl.

In testimony whereof I affix my signature.

JOSEPH SHAPIRO.